(12) United States Patent
Basu

(10) Patent No.: US 8,180,138 B2
(45) Date of Patent: May 15, 2012

(54) METHOD AND SYSTEM FOR INSPECTION OF CONTAINERS

(75) Inventor: Samit K. Basu, Fremont, CA (US)

(73) Assignee: Morpho Detection, Inc., Newark, CA (US)

( * ) Notice: Subject to any disclaimer, the term of this patent is extended or adjusted under 35 U.S.C. 154(b) by 543 days.

(21) Appl. No.: 12/408,751

(22) Filed: Mar. 23, 2009

(65) Prior Publication Data

US 2010/0239182 A1 Sep. 23, 2010

(51) Int. Cl.
*G06K 9/36* (2006.01)

(52) U.S. Cl. ........................................................ 382/141

(58) Field of Classification Search .................. 382/141, 382/143, 173; 378/57
See application file for complete search history.

(56) References Cited

U.S. PATENT DOCUMENTS

| | | |
|---|---|---|
| 7,170,966 B2 | 1/2007 | Kuo-Petravic et al. |
| 7,319,737 B2 | 1/2008 | Singh |
| 7,330,528 B2 | 2/2008 | Jefferson |
| 7,356,116 B2 | 4/2008 | Anwar et al. |
| 7,362,847 B2 | 4/2008 | Bijjani |
| 7,386,092 B2 | 6/2008 | Kang et al. |
| 7,492,862 B2 | 2/2009 | Bendahan |
| 7,499,522 B2 | 3/2009 | Chen et al. |
| 7,502,442 B2 | 3/2009 | Rushbrooke et al. |
| 2002/0114530 A1* | 8/2002 | Duarte ........................... 382/254 |
| 2005/0249416 A1 | 11/2005 | Leue et al. |
| 2007/0297656 A1 | 12/2007 | DeMan et al. |
| 2008/0175456 A1* | 7/2008 | Ioannou ......................... 382/131 |
| 2008/0304622 A1 | 12/2008 | Morton |
| 2009/0060135 A1 | 3/2009 | Morton |

FOREIGN PATENT DOCUMENTS

EP 1531426 A1 5/2005

OTHER PUBLICATIONS

European Search Report; Application No. 10156727.9; dated Mar. 21, 2011; pp. 7.

* cited by examiner

*Primary Examiner* — Kara E Geisel
(74) *Attorney, Agent, or Firm* — Armstrong Teasdale LLP

(57) ABSTRACT

A method and system for reconstructing and segmenting an image of the contents of a container. The method includes receiving actual scan data from a scan of the container, reconstructing the actual scan data to obtain a reconstructed image, and segmenting the reconstructed image to obtain a segmented image. The method also includes deriving simulated scan data corresponding to the segmented image, calculating an error term based on a difference between the simulated scan data and the actual scan data, and determining whether a criterion is satisfied. The method further includes using the error term to produce a modified reconstructed image and repeating the preceding steps with the modified reconstructed image substituted for the reconstructed image if the criterion is not satisfied, and outputting information from the segmented image if the criterion is satisfied.

17 Claims, 4 Drawing Sheets

METHOD AND SYSTEM FOR INSPECTION OF CONTAINERS

BACKGROUND OF THE INVENTION

1. Field of the Invention

The embodiments described herein relate generally to inspection of containers and, more particularly, to reconstructing and segmenting images of the contents of the containers to facilitate detecting objects concealed within the container.

2. Description of Prior/Related Art

At least some known detection systems construct an image of a container and analyze the image to detect explosives, drugs, weapons, and/or other contraband objects within the container. At least one known method for detecting objects within a container includes a first step of scanning the container with X-rays and reconstructing an image of the container, and a second step of inspecting the reconstructed image to detect objects of interest.

The first step involves reconstruction of an image, such as a computed tomography (CT) image, of the interior of the container. Each pixel in the reconstructed image generally represents a relative X-ray attenuation caused by the contents of the container corresponding to that pixel location. Known methods of image reconstruction include, for example, filtered backprojection (FBP) and iterative reconstruction (IR). Known implementations of these methods attempt to optimize performance based on various image-quality metrics. Such known image reconstruction algorithms typically have been developed for use by the medical community and, therefore, implementations of these algorithms are optimized for human interpretation of the images for the purpose of diagnosing disease.

At least some known detection systems accept such final reconstructed images as an input and apply various inspection algorithms to identify objects of interest within the image. Such inspection algorithms typically begin with a procedure, often referred to as image "segmentation" and/or "labeling," to group the elements of the image data into clusters of like values that may correspond to particular objects or sub-objects within the container. Such known image segmentation procedures typically assume that certain inhomogeneities in the image data received from the reconstruction algorithm are artifacts induced in the reconstructed image through inconsistencies, noise, or errors in the measured X-ray data. As a result, detection systems using known image reconstruction and inspection algorithms must apply complex heuristic corrections during the inspection step to compensate for errors passed through from the image reconstruction step. The separation of image reconstruction and image segmentation into two independent steps thus decreases an accuracy of, and increases a time and cost required for inspection by, known detection systems.

BRIEF SUMMARY OF THE INVENTION

In one aspect, a method for reconstructing and segmenting an image of the contents of a container is provided. The method includes receiving actual scan data from a scan of the container, reconstructing the actual scan data to obtain a reconstructed image, and segmenting the reconstructed image to obtain a segmented image. The method also includes deriving simulated scan data corresponding to the segmented image, calculating an error term based on a difference between the simulated scan data and the actual scan data, and determining whether a criterion is satisfied. The method further includes using the error term to produce a modified reconstructed image and repeating the preceding steps with the modified reconstructed image substituted for the reconstructed image if the criterion is not satisfied, and outputting information from the segmented image if the criterion is satisfied.

In another aspect, an inspection system for detecting objects within a container is provided. The system includes a processor configured to receive actual scan data from a scan of the container, reconstruct the actual scan data to obtain a reconstructed image, and segment the reconstructed image to obtain a segmented image. The processor is also configured to derive simulated scan data corresponding to the segmented image, calculate an error term based on a difference between the simulated scan data and the actual scan data, and determine whether a criterion is satisfied. The processor is further configured to use the error term to produce a modified reconstructed image and to repeat the preceding steps with the modified reconstructed image substituted for the reconstructed image if the criterion is not satisfied, and output information from the segmented image if the criterion is satisfied.

In still another aspect, a computer program embodied on a computer-readable medium is provided. The computer program includes a code segment that configures a processor to receive actual scan data from a scan of the container, reconstruct the actual scan data to obtain a reconstructed image, and segment the reconstructed image to obtain a segmented image. The code segment also configures the processor to derive simulated scan data corresponding to the segmented image, calculate an error term based on a difference between the simulated scan data and the actual scan data, and determine whether a criterion is satisfied. The code segment further configures the processor to use the error term to produce a modified reconstructed image and to repeat the preceding steps with the modified reconstructed image substituted for the reconstructed image if the criterion is not satisfied, and output information from the segmented image if the criterion is satisfied.

BRIEF DESCRIPTION OF THE DRAWINGS

FIG. 1 is a block diagram of an exemplary inspection system.

FIG. 2 is a flowchart of an exemplary embodiment of a method for reconstructing and segmenting images that may be used with the system shown in FIG. 1.

FIG. 3 is a flowchart of an exemplary embodiment of a segmentation operation that may be used with the method shown in FIG. 2.

FIG. 4 is a flowchart of an alternative exemplary embodiment of a segmentation operation that may be used with the method shown in FIG. 2.

DETAILED DESCRIPTION OF THE INVENTION

At least one embodiment of the present invention is described below with reference to a system for inspecting luggage. However, it should be apparent to those skilled in the art and guided by the teachings herein that embodiments of the invention likewise are applicable to any suitable system for scanning cargo containers including, without limitation, crates, boxes, drums, containers, baggage, and suitcases, transported by water, land, and/or air, as well as other containers and/or objects.

Moreover, although embodiments of the present invention are described below with reference to a system incorporating an X-ray computed tomography (CT) scanning system for inspecting luggage, it should apparent to those skilled in the art and guided by the teachings herein provided that any suitable scanning radiation source including, without limitation, neutrons or gamma rays, may be used in alternative embodiments. Further, it should be apparent to those skilled in the art and guided by the teachings herein provided that any scanning system may be used that produces a sufficient number of image elements to enable the functionality of the inspection system described herein. The term "image element" refers to an element, such as a pixel and/or voxel, within image data. Embodiments of the present invention may be used in association with three-dimensional images comprising voxels, or alternatively with two-dimensional images comprising pixels, or alternatively with images of any suitable dimension comprising any suitable combination and/or type of image element.

Figure 1:
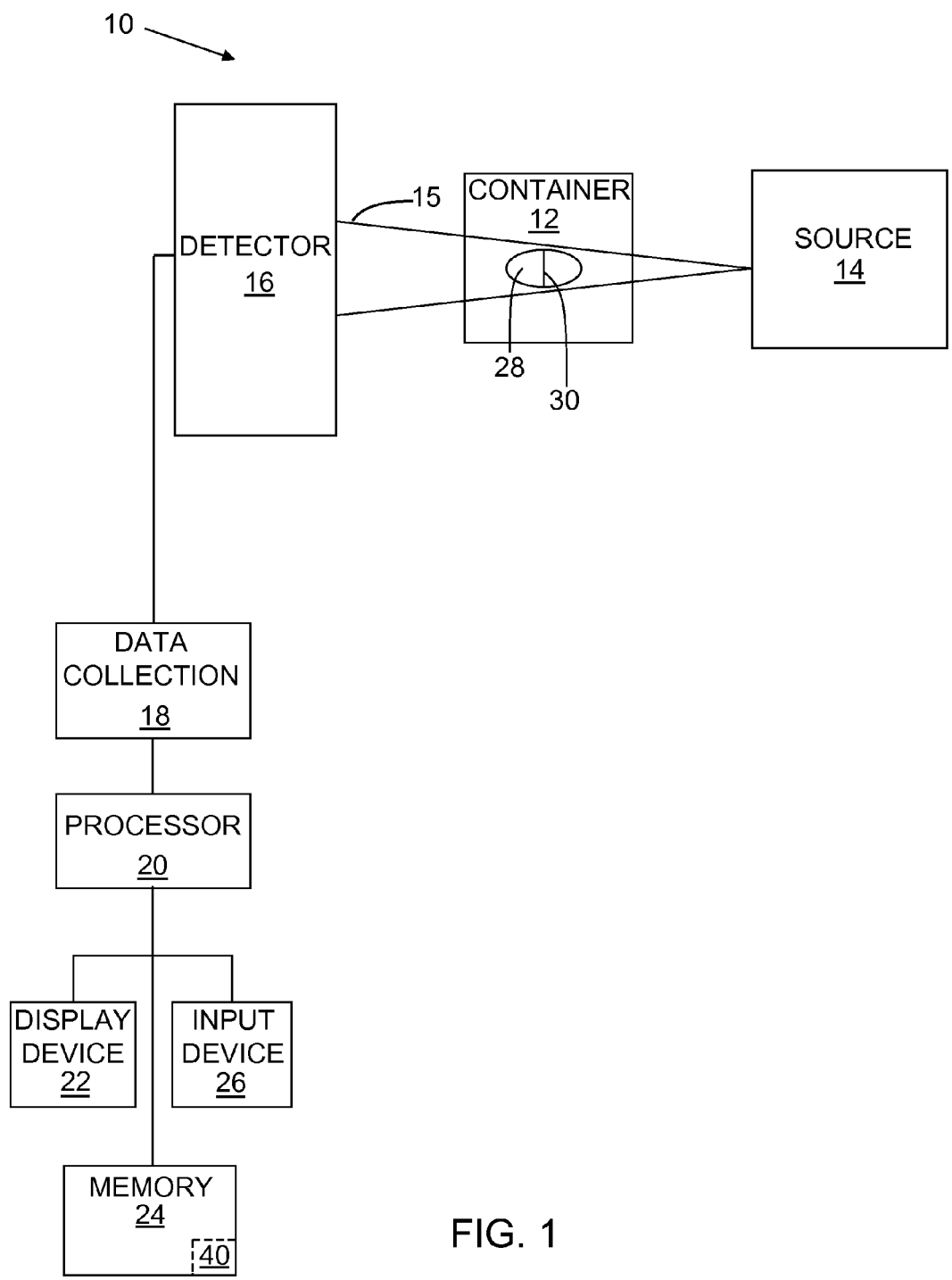
FIGS. 1-4 show exemplary embodiments of the systems and methods described herein.

FIG. 1 is a block diagram of an exemplary inspection system 10 for scanning a container 12, such as a cargo container, box, parcel, luggage, or suitcase, to identify the contents and/or determine the type of material contained within container 12. The term "contents" as used herein refers to any object and/or material contained within container 12 and may include contraband.

In an exemplary embodiment, inspection system 10 includes at least one X-ray source 14 configured to transmit at least one primary beam 15 of radiation through container 12. In an alternative embodiment, inspection system 10 includes a plurality of X-ray sources 14 configured to emit radiation of different energy distributions. Alternatively, each X-ray source 14 is configured to emit radiation of selective energy distributions, which can be emitted at different times. In a particular embodiment, inspection system 10 utilizes multiple-energy scanning to obtain an attenuation map for container 12. In addition to the production of CT images, multiple-energy scanning enables the production of density maps and atomic number of the object contents. In one embodiment, the dual energy scanning of container 12 includes scanning container 12 at a low energy and then scanning container 12 at a high energy. The data is collected for the low-energy scan and the high-energy scan to reconstruct a density image and/or atomic number image of container 12, as well as a CT image, to further facilitate identifying the type of material within container 12.

In an exemplary embodiment, inspection system 10 also includes at least one X-ray detector 16 configured to detect radiation emitted from X-ray source 14 and transmitted through container 12. X-ray detector 16 is configured to cover an entire field of view or only a portion of the field of view. In certain embodiments, X-ray detector 16 includes a plurality of X-ray detector elements (not shown) arranged in a one-dimensional or two-dimensional matrix configuration. Upon detection of the transmitted radiation, X-ray detector 16 generates signals representative of the detected transmitted radiation.

In an exemplary embodiment of inspection system 10, a data collection system 18 is operatively coupled to and in signal communication with X-ray detector 16. Data collection system 18 is configured to receive the signals generated and transmitted by X-ray detector 16. A processor 20 is operatively coupled to data collection system 18. Processor 20 is configured to generate one or more images of container 12 and its contents and to process the produced image(s) to facilitate an inspection of the contents of container 12. As used herein, the term "processor" is not limited to only integrated circuits referred to in the art as a processor, but broadly refers to a computer, a microcontroller, a microcomputer, a programmable logic controller, an application specific integrated circuit and any other programmable circuit. In certain embodiments, processor 20 refers to multiple individual processors, whether operating in concert or independently of each other. In certain embodiments, processor 20 reconstructs a CT image of container 12 in real time, near-real time, or delayed time. In the exemplary embodiment, such CT images are generated and examined to infer the presence and shape of objects, such as object 28 and object 30, within container 12.

In the exemplary embodiment, inspection system 10 also includes a display device 22, a memory device 24 and/or an input device 26 operatively coupled to data collection system 18 and/or processor 20. Display device 22 may be, but is not limited to, a monitor, a cathode ray tube (CRT), a liquid crystal display (LCD), and/or another suitable output device that enables system 10 to function as described herein. Memory device 24 may be, but is not limited to, a random access memory (RAM), a read-only memory (ROM), a magnetic or optical drive (not shown), and/or another suitable storage device that enables inspection system 10 to function as described herein. Input device 26 may be, but is not limited to, a mouse, a keyboard, and/or another suitable input device that enables inspection system 10 to function as described herein.

In the exemplary embodiment, memory device 24 stores a model 40 of inspection system 10. Processor 20 may apply model 40 to an image to produce simulated scan data corresponding to the image. More specifically, for any image, model 40 allows processor 20 to simulate the scan data that would have to be acquired by system 10 in order to cause inspection system 10 to reconstruct such an image. Model 40 may be, but is not limited to, a forward projection model of inspection system 10.

Figure 2:
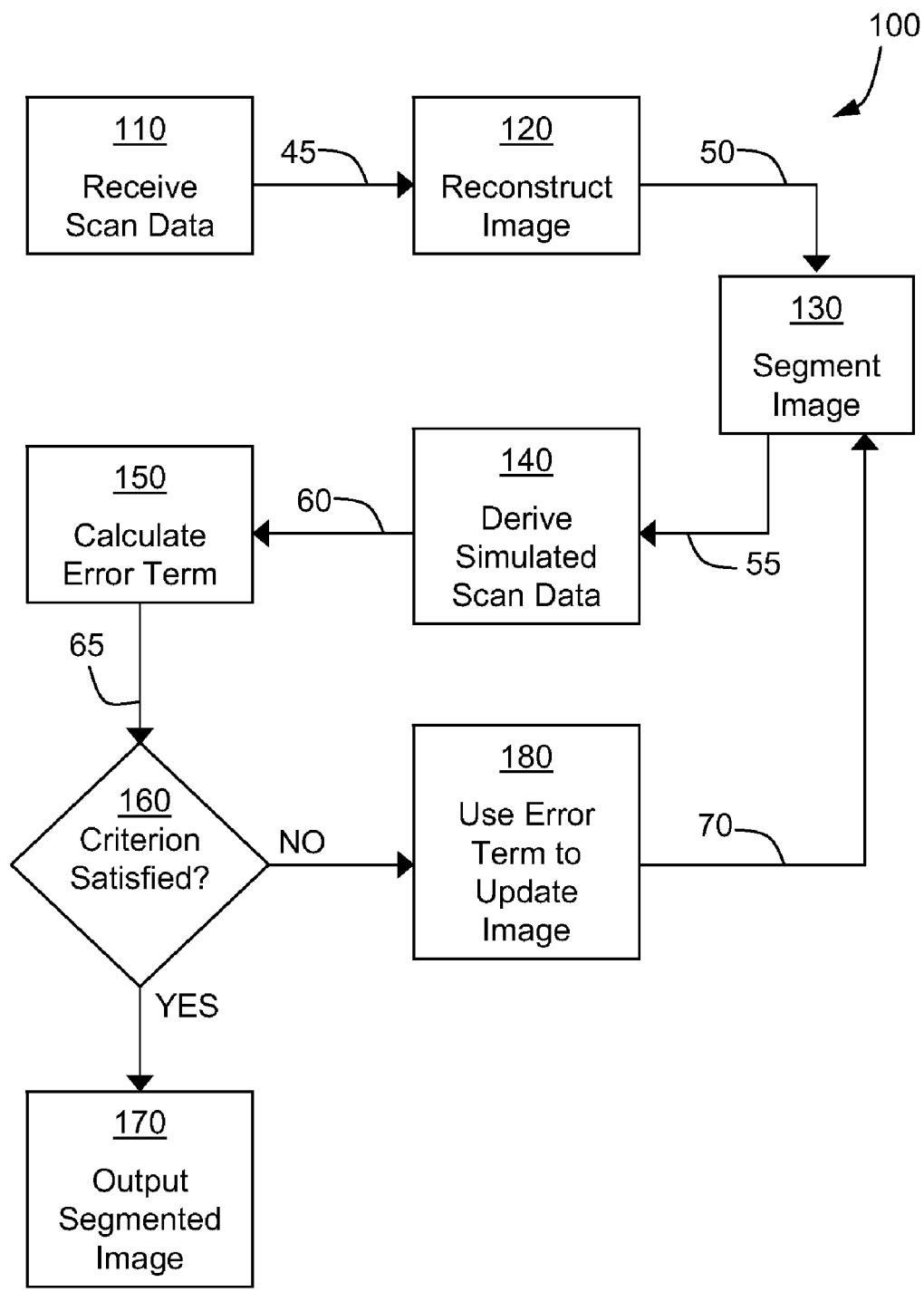

FIG. 2 shows a flowchart illustrating a method 100 for identifying objects within a container. In the exemplary embodiment, method 100 is implemented on inspection system 10. However, method 100 is not limited to implementation on inspection system 10, but rather method 100 may be embodied on any suitable system, such as a separate system that receives any suitable images for inspection. Moreover, method 100 may be embodied on a computer readable medium as a computer program, and/or implemented and/or embodied by any other suitable means. The computer program may include a code segment that, when executed by a processor, configures the processor to perform one or more of the functions of method 100.

In an exemplary embodiment of method 100, processor 20 receives 110 scan data 45, for example CT data from a scan of container 12 by system 10 (shown in FIG. 1). Processor 20 reconstructs 120 a reconstructed image 50 from the received scan data 45 using any suitable reconstruction method, such as, but not limited to, a filtered back-projection algorithm. Next, processor 20 segments 130 the reconstructed image 50 using any suitable method such as, but not limited to, seeded region-growing, unseeded region-growing, clustering, edge detection, and/or a histogram-based algorithm, to obtain a segmented image 55. Such methods implicitly assume that container 12 contains a number of discrete objects such as objects 28 and 30 (shown in FIG. 1) that each are homogeneous and, therefore, that images of the interior of container 12 are amenable to segmentation. Segmentation step 130 may include a thresholding step to reduce, for example, background objects, clutter or artifacts in the reconstructed image 50.

Figure 3:
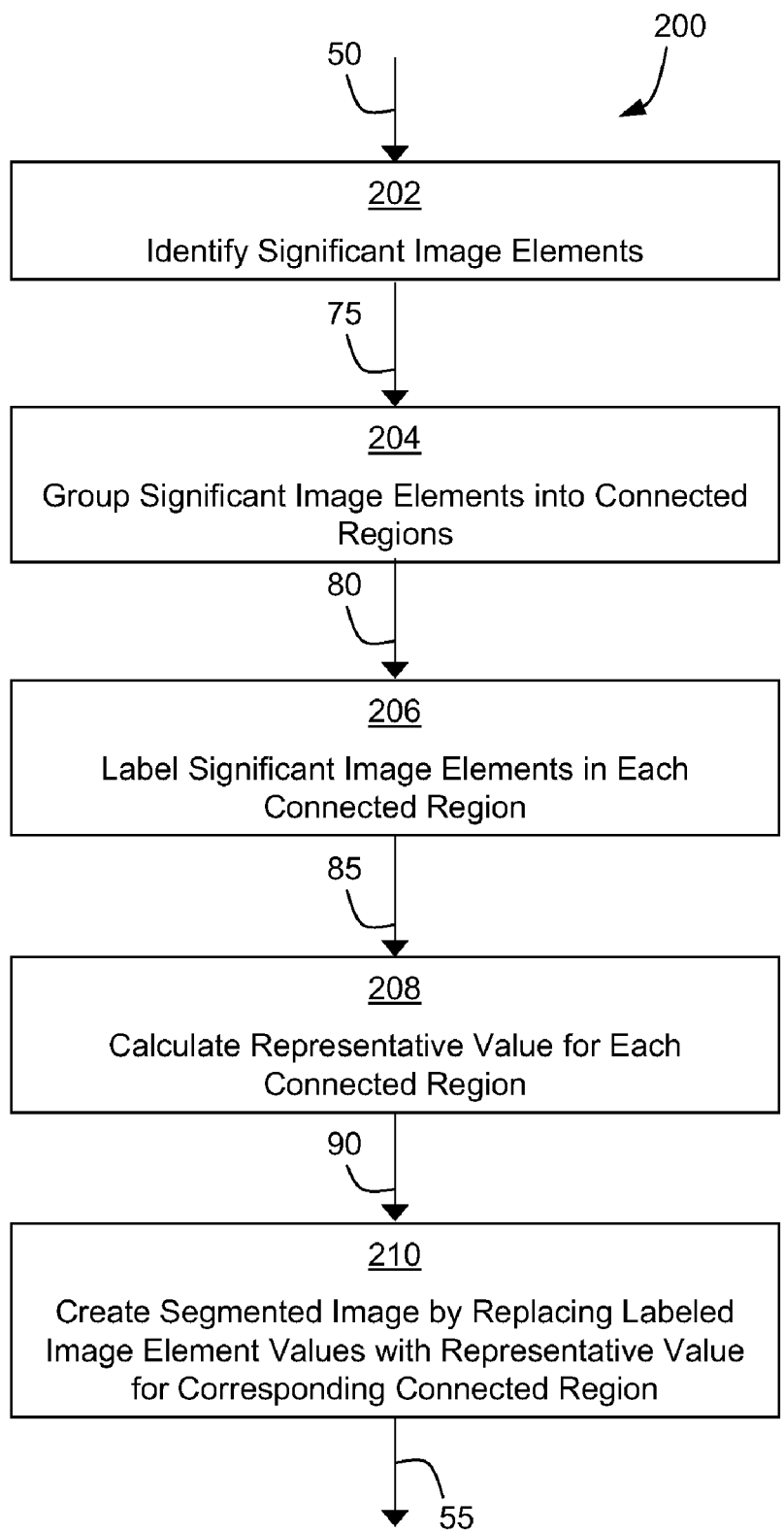

For example, in an exemplary embodiment of a method 200 for performing segmentation step 130 as shown in FIG. 3, processor 20 identifies 202 a plurality of significant image elements 75 in reconstructed image 50. Significant image elements 75 are those image elements that are assumed to belong to significant objects within container 12 (shown in FIG. 1). For example, but not by way of limitation, significant image elements 75 may be identified as those having CT values that are above a threshold value. Processor 20 then groups 204 the plurality of significant image elements 75 into a plurality of connected regions 80. For example, processor 20 applies a suitable clustering algorithm, such as a connected components analysis (CCA), that groups 204 together significant image elements having certain characteristics. Moreover, processor 20 labels 206 each significant image element 75 that is grouped into at least a first connected region 80 as a labeled image element 85 of the first connected region 80. Further in the exemplary embodiment, processor 20 calculates 208 a representative value 90 of first connected region 80. For example, processor 20 calculates 208 representative value 90 to be the average CT value of labeled image elements 85 of first connected region 80. In alternative embodiments, representative value 90 is, for example but not by way of limitation, a mode CT value of labeled image elements 85 of first connected region 80, or some other suitable statistic. Processor 20 then creates 210 segmented image 55 from reconstructed image 50 by replacing a value of each labeled image element 85, for example the CT value, with the corresponding representative value 90.

Figure 4:
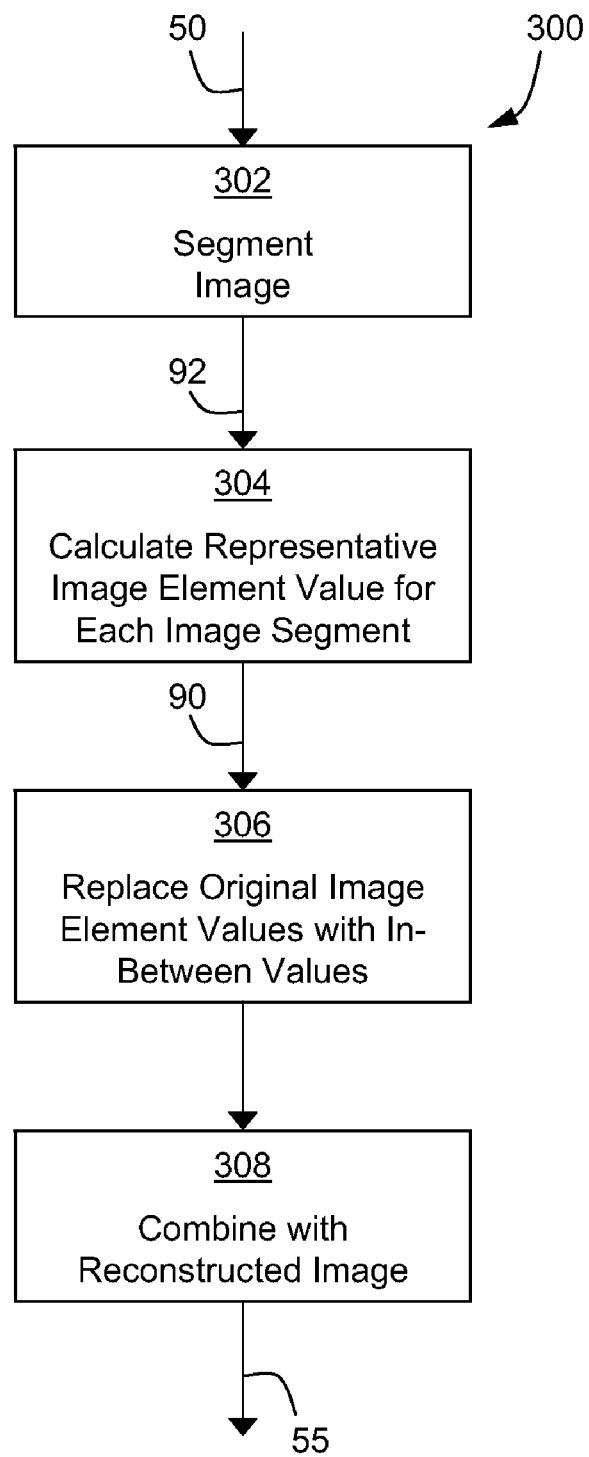

In certain circumstances, exemplary embodiment 200 of segmentation step 130 may operate in a strongly non-linear fashion. An alternative exemplary embodiment 300 of segmentation step 130, shown in FIG. 4, illustrates alternative or additional steps that may be included in segmentation step 130 to reduce the non-linearity. Processor 20 initially segments 302 the reconstructed image 50 using any suitable method to obtain at least one image segment 92. If the method used is a clustering algorithm, for example, the at least one image segment 92 is akin to at least first connected region 80 (shown in FIG. 3). Processor 20 then calculates 304 representative value 90, for example an average CT number, for the at least one image segment 92. For each image element of a plurality of image elements within the at least one segment 92, processor 20 further replaces 306 an original value associated with the image element with a value between the original value and representative value 90 for the at least one segment 92. Processor 20 combines 308 the plurality of image elements having replaced values with reconstructed image 50 to obtain segmented image 55.

Returning to FIG. 2, processor 20 further derives 140 simulated scan data 60 corresponding to the scan data that would have to be acquired by system 10 in order to obtain segmented image 55 as an output of reconstruction step 120. For example, processor 20 may use a forward-projection algorithm incorporating model 40 to derive 140 simulated scan data 60 from segmented image 55.

Further in the exemplary embodiment, processor 20 calculates 150 an error term 65 based on a difference between simulated scan data 60 and actual scan data 45. Calculation 150 may be any suitable method that quantifies a variation between simulated scan data 60 and actual scan data 45. In the exemplary embodiment, error term 65 is in the form of a sinogram, that is, it has the same dimensions, and may have the same units, as actual scan data 45. For example, error term 65 may be a set of values representing a difference between each value in actual scan data 45 and the corresponding value in simulated scan data 60, with some weighting applied. In certain embodiments, such weighting is chosen based on statistical estimates of the reliability of particular measurements within actual scan data 45. For example, attenuation measurements by elements of X-ray detector 16 (shown in FIG. 1) that represent very low intensities may be considered less reliable than measurements that represent higher intensities. In such cases, the difference between actual scan data 45 and simulated scan data 60 for such low-intensity values may be weighted to have a smaller contribution to error term 65. In an alternative embodiment, error term 65 is computed as a set of values based on a ratio of each value of simulated scan data 60 to the corresponding value in actual scan data 45. Other functions may also be applied to error term 65 on a value-by-value basis.

Processor 20 then determines 160 whether a criterion is satisfied. For example, but not by way of limitation, the criterion may depend on a function based on the values of error term 65, such as a maximum acceptable value for a summation of the squares of the values of error term 65. Additionally or alternatively, the criterion may include a predetermined maximum number of iterations.

If processor 20 determines 160 that the criterion is satisfied, for example, if a function based on the values of error term 65 is below a maximum acceptable value or if a predetermined number of iterations has been reached, processor 20 outputs 170 information from segmented image 55. For example, but not by way of limitation, processor 20 outputs 170 segmented image 55 itself by displaying it to an operator on display 22 and/or storing it in computer-readable memory 24.

On the other hand, if processor 20 determines 160 that the criterion is not satisfied, processor 20 uses 180 error term 65, for example by applying a suitable filtered back-projection algorithm, to produce a modified reconstructed image 70. Segmentation 130, derivation 140 of simulated scan data 60, and calculation 150 of error term 65 are then repeated, with modified reconstructed image 70 substituted for reconstructed image 50. In the exemplary embodiment, this iteration of steps continues until the criterion of step 160 is satisfied, at which point processor 20 outputs 170 information from resulting segmented image 55.

The above-described systems and methods for inspection of containers facilitate increasing an accuracy of, and decreasing a time and cost required for, the detection of objects, including contraband, within containers. More specifically, the embodiments described herein combine image reconstruction and image segmentation into a single operation, and also incorporate into image reconstruction the expectation that the container contains a discrete number of homogeneous objects. A technical effect of the embodiments described herein is to reduce a number of artifacts in a reconstructed and/or segmented image. A further technical effect of the embodiments described herein is to reduce a need for inspection algorithms to apply complex heuristic corrections during the inspection step to compensate for errors passed through from the image reconstruction step.

Exemplary embodiments of methods and systems for inspection of containers are described above in detail. The methods and systems are not limited to the specific embodiments described herein, but rather, components of systems and/or steps of the methods may be utilized independently and separately from other components and/or steps described herein. For example, the methods may also be used in combination with other imaging systems and methods, and are not limited to practice with only the inspection systems as described herein. Rather, the exemplary embodiments can be implemented and utilized in connection with many other inspection and/or detection applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for reconstructing and segmenting an image of the contents of a container, said method comprising:
   (i) receiving actual scan data from a scan of the container;
   (ii) reconstructing the actual scan data to obtain a reconstructed image;
   (iii) segmenting the reconstructed image to obtain a segmented image, wherein said segmenting the reconstructed image comprises applying an algorithm including at least one of a seeded region-growing algorithm, an unseeded region-growing algorithm, a clustering algorithm, an edge detection algorithm, and a histogram-based algorithm to the reconstructed image;
   (iv) deriving simulated scan data corresponding to the segmented image;
   (v) calculating an error term based on a difference between the simulated scan data and the actual scan data;
   (vi) determining whether a criterion is satisfied;
   (vii) using the error term to produce a modified reconstructed image and repeating steps (iii) through (vii) with the modified reconstructed image substituted for the reconstructed image obtained in step (ii), if the criterion is not satisfied; and
   (viii) outputting information from the segmented image if the criterion is satisfied.

2. A method in accordance with claim 1, wherein said segmenting the reconstructed image to obtain a segmented image further comprises:
   identifying a plurality of significant image elements in the reconstructed image;
   grouping the plurality of significant image elements into a plurality of connected regions;
   labeling each significant image element of the plurality of significant image elements that is grouped into at least a first connected region of the plurality of connected regions as a labeled image element of the first connected region;
   calculating a representative value for the first connected region; and
   creating the segmented image from the reconstructed image by replacing a value of each labeled image element of the first connected region with the representative value.

3. A method in accordance with claim 1, wherein said segmenting the reconstructed image further comprises:
   segmenting the reconstructed image to obtain at least one image segment;
   calculating a representative image element value for the at least one image segment;
   replacing an original value associated with each image element of a plurality of image elements within the at least one image segment with a value between the original value and the representative image element value; and
   combining the plurality of image elements with a remainder of the reconstructed image to obtain the segmented image.

4. A method in accordance with claim 1, wherein said reconstructing the actual scan data to obtain a reconstructed image comprises applying a filtered back-projection algorithm to the actual scan data.

5. A method in accordance with claim 1, wherein said deriving simulated scan data corresponding to the segmented image comprises applying a forward-projection algorithm to the segmented image.

6. A method in accordance with claim 1, wherein said using the error term to produce a modified reconstructed image comprises applying a filtered back-projection algorithm using the error term.

7. An inspection system for detecting objects within a container, said inspection system comprising a processor configured to:
   (i) receive actual scan data from a scan of the container;
   (ii) reconstruct the actual scan data to obtain a reconstructed image;
   (iii) segment the reconstructed image to obtain a segmented image, wherein said processor is configured to segment the reconstructed image by applying an algorithm including at least one of a seeded region-growing algorithm, an unneeded region-growing algorithm, a clustering algorithm, an edge detection algorithm, and a histogram-based algorithm to the reconstructed image;
   (iv) derive simulated scan data corresponding to the segmented image;
   (v) calculate an error term based on a difference between the simulated scan data and the actual scan data;
   (vi) determine whether a criterion is satisfied;
   (vii) use the error term to produce a modified reconstructed image and repeat steps (iii) through (vii) with the modified reconstructed image substituted for the reconstructed image obtained in step (ii), if the criterion is not satisfied; and
   (viii) output information from the segmented image if the criterion is satisfied.

8. An inspection system in accordance with claim 7, wherein said processor is further configured to:
   identify a plurality of significant image elements in the reconstructed image;
   group the plurality of significant image elements into a plurality of connected regions;
   label each significant image element of the plurality of significant image elements that is grouped into at least a first connected region of the plurality of connected regions as a labeled image element of the first connected region;
   calculate a representative value for the first connected region; and
   create the segmented image from the reconstructed image by replacing a value of each labeled image element of the first connected region with the representative value.

9. An inspection system in accordance with claim 7, wherein said processor is further configured to:
   segment the reconstructed image to obtain at least one image segment;
   calculate a representative image element value for the at least one image segment;
   replace an original value associated with each image element of a plurality of image elements within the at least one image segment with a value between the original value and the representative image element value; and combine the plurality of image elements with a remainder of the reconstructed image to obtain the segmented image.

10. An inspection system in accordance with claim 7, wherein said processor is further configured to apply a filtered back-projection algorithm to the actual scan data to obtain the reconstructed image.

11. An inspection system in accordance with claim 7, wherein said processor is further configured to apply a forward-projection algorithm to the segmented image to derive simulated scan data corresponding to the segmented image.

12. An inspection system in accordance with claim 7, wherein said processor is further configured to apply a filtered back-projection algorithm using the error term to produce the modified reconstructed image.

13. A computer-readable storage medium, said computer-readable storage medium being encoded with a computer program comprising a code segment that configures a processor to:
  (i) receive actual scan data from a scan of a container by an inspection system;
  (ii) reconstruct the actual scan data to obtain a reconstructed image;
  (iii) segment the reconstructed image to obtain a segmented image, the code segment configuring the processor to segment the reconstructed image by applying an algorithm including at least one of a seeded region-growing algorithm, an unseeded region-growing algorithm, a clustering algorithm, an edge detection algorithm, and a histogram-based algorithm to the reconstructed image;
  (iv) derive simulated scan data corresponding to the segmented image;
  (v) calculate an error term based on a difference between the simulated scan data and the actual scan data;
  (vi) determine whether a criterion is satisfied;
  (vii) use the error term to produce a modified reconstructed image and repeat steps (iii) through (vii) with the modified reconstructed image substituted for the reconstructed image obtained in step (ii), if the criterion is not satisfied; and
  (viii) output information from the segmented image if the criterion is satisfied.

14. A computer-readable storage medium in accordance with claim 13, wherein the code segment further configures the processor to:
  identify a plurality of significant image elements in the reconstructed image;
  group the plurality of significant image elements into a plurality of connected regions;
  label each significant image element of the plurality of significant image elements that is grouped into at least a first connected region of the plurality of connected regions as a labeled image element of the first connected region;
  calculate a representative value for the first connected region; and
  create the segmented image from the reconstructed image by replacing a value of each labeled image element of the first connected region with the representative value.

15. A computer readable storage medium in accordance with claim 13, wherein the code segment further configures the processor to:
  segment the reconstructed image to obtain at least one image segment;
  calculate a representative image element value for the at least one image segment;
  replace an original value associated with each image element of a plurality of image elements within the at least one image segment with a value between the original value and the representative image element value; and
  combine the plurality of image elements with a remainder of the reconstructed image to obtain the segmented image.

16. A computer-readable storage medium in accordance with claim 13, wherein the code segment further configures the processor to apply a forward-projection algorithm to the segmented image to derive simulated scan data corresponding to the segmented image.

17. A computer-readable storage medium in accordance with claim 13, wherein the code segment further configures the processor to apply a filtered back-projection algorithm using the error term to produce the modified reconstructed image.

* * * * *